3,620,070
ULTRASONIC MATERIAL TESTER
Original Filed Aug. 3, 1966
2 Sheets-Sheet 1
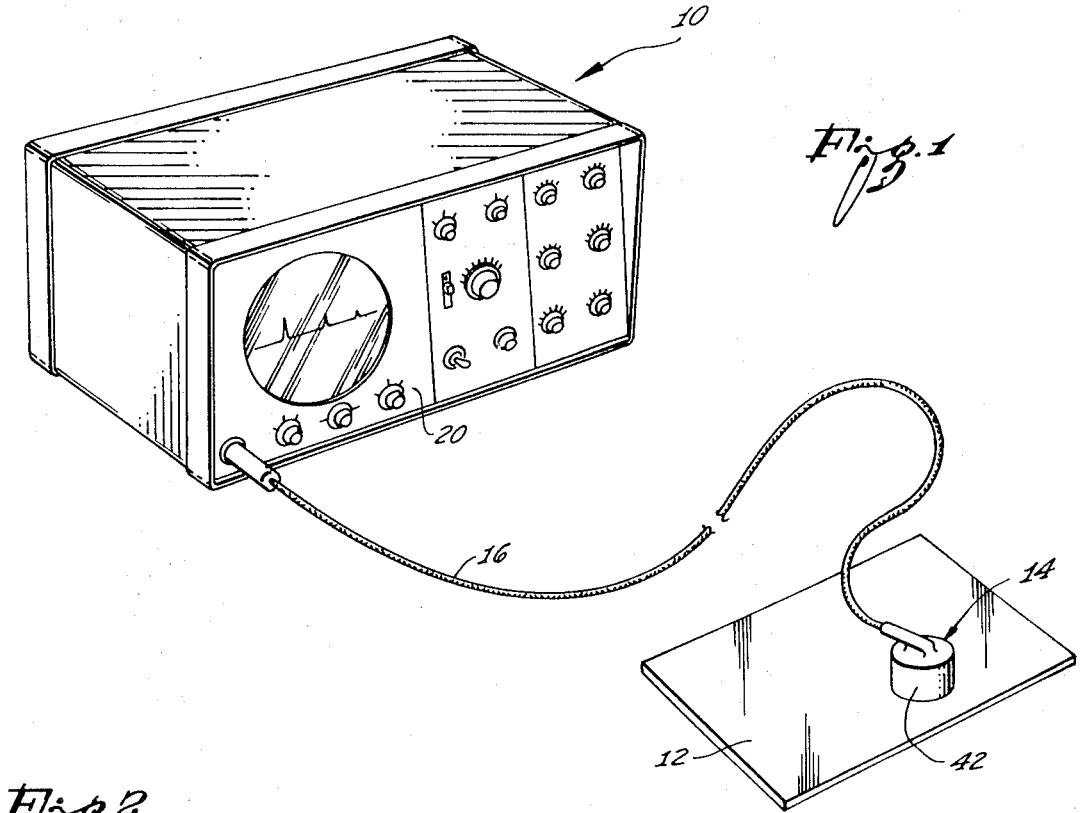
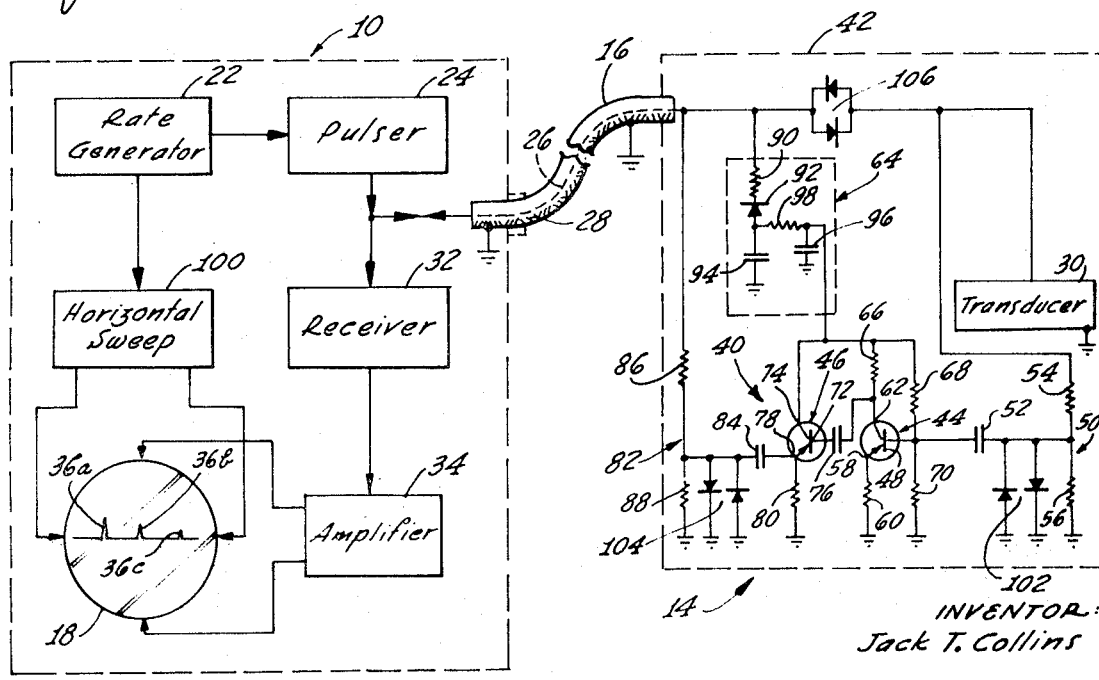
INVENTOR:
Jack T. Collins
ATTORNEY Nov. 16, 1971 J. T. COLLINS 3,620,070
ULTRASONIC MATERIAL TESTER
Original Filed Aug. 3, 1966 2 Sheets-Sheet 2

INVENTOR:
Jack T. Collins

Dan R Sadler
ATTORNEY

United States Patent Office 3,620,070
Patented Nov. 16, 1971

3,620,070
ULTRASONIC MATERIAL TESTER
Jack T. Collins, Boulder, Colo., assignor to Automation Industries, Inc., El Segundo, Calif.
Continuation of application Ser. No. 575,210, Aug. 3, 1966. This application Dec. 22, 1969, Ser. No. 883,677
Int. Cl. G01n 29/04
U.S. Cl. 73—67.8   16 Claims

ABSTRACT OF THE DISCLOSURE

An ultrasonic tester having a pulser and receiver connected to a search unit with a transducer through a coaxial cable. A preamplifier, integral with the transducer in the search unit is provided to improve the signal to noise ratio of the returned echo signals. A power supply for the preamplifier is also provided integral with the search unit. The power supply is energized by the transmitted pulse, whereby a portion of the transmitted pulse is rectified and filtered to provide operating voltages to the preamplifier.

CROSS REFERENCE TO RELATED APPLICATION

Figure 3:
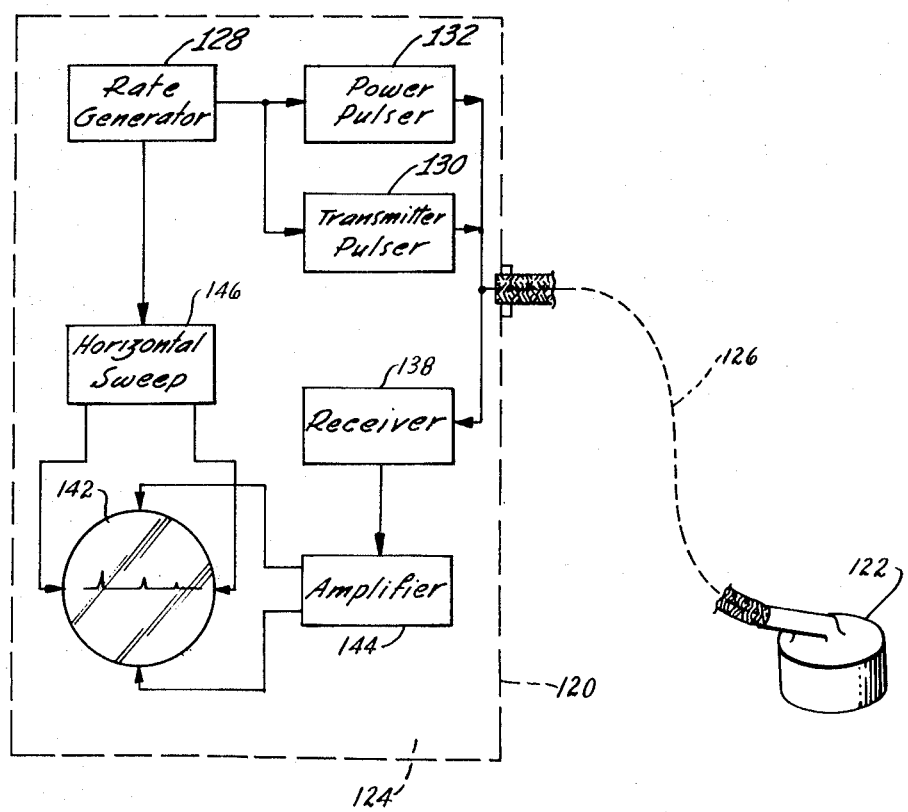

This is a continuation of co-pending application Ser. No. 575,210, filed Aug. 3, 1966, now abandoned, for Material Tester on behalf of Jack T. Collins.

The present invention relates to ultrasonic equipment for nondestructively testing workpieces and more particularly to search units for increasing the accuracy and sensitivity of such testing equipment.

One form of ultrasonic tester employs an electromechanical search unit having a transducer such as a piezoelectric crystal therein. The search unit, and particularly the transducer, are electrically coupled to the test equipment by a suitable transmission line. At the same time the transducer is acoustically coupled to the workpiece. The test equipment periodically generates electrical signals that are coupled over the transmission line to the transducer whereby a short pulse of ultrasonic energy is transmitted into the workpiece. If there are any echoes the transducer generates corresponding target pulses. These target pulses are returned over the transmission line to the test equipment. By determining the presence or absence of these target pulses and/or the time delay the test equipment indicates various characteristics of the workpiece, such as its thickness, location of defects, etc.

Although such systems have been found to be very satisfactory for many applications they do have some limitations which may restrict their usefulness under some circumstances. The signals generated by the transducer as a result of the echoes are of a very low amplitude. These low amplitude signals are further attenuated by the transmission line and even smaller amplitude when they reach the receiver. In fact many of the returning target signals are comparable in magnitude to the noise and spurious signals normally present in a transmission line. As a consequence the signal-to-noise ratio is very low and it is extremely difficult, if not impossible, to make a meaningful and reliable test. This problem becomes particularly acute where the transmission line is relatively long, where the workpiece tends to absorb a substantial portion of the ultrasonic energy and produce weak echoes and where there is large amounts of stray fields incident upon the cable.

To overcome these difficulties it has been customary to utilize a short transmission line with the minimum amount of line losses and the maximum amount of shielding. It has also been proposed to utilize very sensitive transducers capable of generating large amplitude signals in response to weak echoes and to drive the transducer as hard as possible to radiate a maximum amount of ultrasonic energy whereby the echoes are stronger. It has further been proposed to utilize very sensitive, high gain equipment capable of utilizing even extremely weak signals. There are practical limitations as to how far any one or all of these approaches can be carried. It will thus be seen that the currently available ultrasonic testers are not entirely satisfactory for all applications.

The present invention provides ultrasonic equipment which overcomes the foregoing difficulties. More particularly the present invention provides ultrasonic nondestructive testing equipment and a search unit therefore which has a high sensitivity and a large signal-to-noise ratio. As a consequence the returning signals can be easily separated from the surrounding noise and an accurate, reliable test obtained.

The invention as disclosed herein provides a search unit having a transducer and a preamplifier built as an integral part thereof whereby the target signals generated by the transducer are amplified before they are carried over the transmission line or otherwise given an opportunity to become mixed with noise. In addition a self energizing power supply is incorporated into the amplifier whereby separate batteries etc. are not required.

Figure 4:
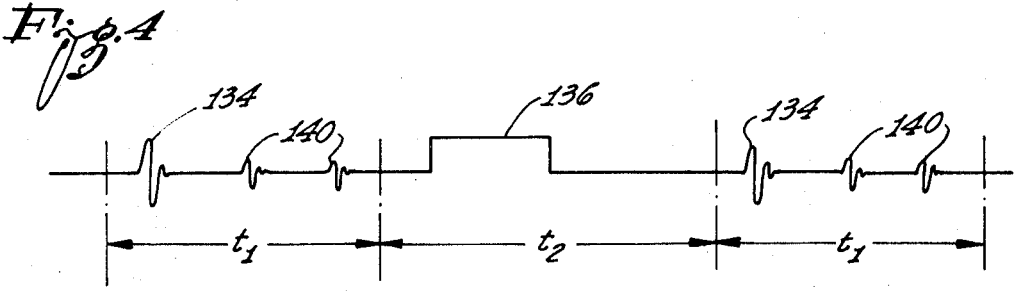

These and other features and advantages of the present invention will become readily apparent from the following detailed description of a limited number of embodiments thereof, particularly when taken in connection with the accompanying drawings wherein:

FIG. 1 is a perspective view of an ultrasonic tester and search unit embodying the present invention, FIG. 2 is a combination schematic-block diagram of the tester and search unit of FIG. 1, FIG. 3 is a combination schematic-block diagram similar to FIG. 2 but showing another embodiment of the present invention, and FIG. 4 is a wave form present in the embodiment of FIG. 3.

Referring to the drawings in more detail the present invention is particularly adapted to be used with an ultrasonic tester 10 for nondestructively inspecting a workpiece 12. The tester 10 is electrically coupled to a search unit 14 by means of a transmission line 16. The search unit 14 is in turn acoustically coupled to the workpiece 12 for transmitting ultrasonic energy into the workpiece 12. The search unit 14 receives echoes of this energy reflected from any acoustical targets within the workpiece 12 and transmits target signals over the transmission line 16 to the tester 10. The tester 10 responds to the target signals and produces indications of thickness, the presence or absence of defects, their locations etc. Although the tester 10 may include any desired type of ultilizing means or meter readout in the present instance a cathode ray tube 18 is employed. The face of the tube 18 is exposed through the front panel 20 of the tester 10 whereby the operator can readily view the resultant luminous displays.

As can be seen in FIG. 2, the tester 10 includes a rate generator 22 which produces a series of periodically occurring timing pulses. These pulses time the operation of the entire tester 10 and among other things define the pulse repetition rate.

One output from the rate generator 22 is coupled to a pulser 24. This pulser 24 is responsive to the periodically occurring timing pulses and is effective to produce a signal suitable for driving the search unit 14. Normally these signals are in the form of high voltage, short duration pulses occurring at the same rate as the timing pulses. The amplitudes of the driving pulses usually are in the region of several hundred volts and the frequency is in the megacycle range. However it should be understood the frequency may extend from about 25 kilocycles up to 25 megacycles or higher.

The output of the pulser 24 is coupled to the search unit 14 by the transmission line 16. This line 16 may be a more or less conventional coaxial cable having a center conductor 26 and a grounded outer conductor 28. The electrical characteristics of this transmission line 16 are matched to those of the pulser 24 and of the search unit 14 and are suitable for carrying signals of the required frequencies. Preferably the line losses are as low as possible and the shielding is sufficiently high to prevent undue interference.

The present search unit 14 includes an outer casing 42 which may be hand held with the face of the unit 14 placed directly against the surface of the workpiece 12 for performing so-called manual contact testing. It should be understood, however, that the search unit 14 may be carried by a mechanical apparatus such as an automatic scanner and it may be immersed in a liquid couplant bath whereby automatic and/or submerged testing may be performed.

The search unit 14 also includes a transducer 30 such as a piezoelectric crystal. This crystal may be of a conventional variety having front and back faces. The faces of the crystal are coupled to the transmission line 16. When a high voltage pulse from the pulser 24 is applied across these two faces, the crystal mechanically vibrates whereby ultrasonic energy is radiated from the search unit into the workpiece. The crystal or transducer 30 is of a reciprocal nature. If any ultrasonic energy is reflected from an acoustical target within the workpiece 12 back to the search unit 14, the crystal will produce a corresponding target signal. This signal normally includes one or more relatively low amplitude pulses corresponding to the reflecting surface. Each of the pulses is delayed from the transmitted pulse by a time interval which is a function of the distance from the search unit 14 to the reflecting surface.

This target signal is coupled back over the transmission line 16 to a receiver 32 located within the tester 10. The receiver 32 is effective to receive or detect the returning target signal and produce signals suitable for coupling into the desired utilizing or output circuitry. If desired a separate amplifier 34 may be provided for amplifying the signals. The output from the amplifier 34 includes a series of target pulses having relatively large amplitudes. Hopefully all of the noise and spurious signals have been removed or at least are of a very small amplitude relative to the target pulses.

The output of the amplifier 34 is coupled to the utilizing means for supplying the amplified signals thereto. In the present instance this is the cathode ray tube 18 having horizontal and vertical deflection means. The vertical deflection means are coupled to a dual output of the amplifier 34. The horizontal deflection means are coupled to a suitable horizontal sweep circuit 100. This circuit may be coupled to the rate generator 22 whereby horizontal scanning will be synchronized with the transmission of the ultrasonic energy.

This produces a horizontal display with a series of vertical "pips" 36 corresponding to the target pulses. The first "pip" 36a normally represents the main bang, i.e. the initial transmission of the ultrasonic energy. The succeeding "pips" 36b and 36c correspond to targets such as defects and/or the various surfaces of the workpiece 12 etc. The horizontal displacements of the successive "pips" represent the ranges to the reflecting target.

It can be appreciated if the signal includes a large amount of noise and spurious signals it becomes very difficult for the operator to recognize the valid "pips" 36.

In order to improve the ability of the operator to accurately read the display, means are provided within the search unit 14 for increasing its effective sensitivity and improving the signal-to-noise ratio. In the present instance this means includes a miniaturized amplifier 40 built into the search unit housing 42 immediately adjacent to the crystal. This amplifier 40 is effective to amplify the signal as it is generated and before any appreciable noise is combined therewith. As a consequence a high signal to-noise ratio is maintained at all times.

The present amplifier 40 is of the transistorized variety and includes a pair of cascaded transistors 44 and 46. The base 48 of the first transistor 44 is coupled to the center of a voltage dividing network 50 by means of a condenser 52. The network 50 includes a pair of resistors 54 and 56 that extend across the transmission line 16. It will be seen that any signals generated by the crystal 30 will be quickly coupled to the base 48 before they travel any appreciable distance. The emitter 58 is connected directly to ground by resistor 60 while the collector 62 is coupled to the power supply 64 by a load resistor 66. The base 48 is also coupled to the power supply 64 by a biasing network which includes resistors 68 and 70.

The base 72 of the second transistor 46 is coupled to the junction between the load 66 and collector 62 by a condenser 76. The collector 74 is coupled directly to the power supply 64 while the emitter 78 is grounded by a load resistor 80. The emitter 78 is coupled to the junction in a voltage dividing network 82 by a condenser 84. The dividing network 82 includes a pair of resistors 86 and 88 coupled across the transmission line 16. The second transistor 46 is thus effective to function as an emitter follower and match the output impedance of the amplifier 40 to the transmission line 16 whereby the amplified signal will be efficiently coupled onto the transmission line 16.

The power supply 64 is preferably built into the search unit 14 so as to be wholly contained therein. It is also desirable for the power supply 64 to be of a permanent nature that does not require any servicing such as replacing batteries, etc. The present power supply 64 satisfies these requirements and includes a resistor 90, a diode 92 and a condenser 94 that extends across the transmission line 16. When the pulser 24 sends a high voltage pulse over the transmission line 16, the diode 92 will allow a DC charge to be accumulated on the condenser 94. A second condenser 96 may be coupled across the first condenser 94 by means of a filtering resistor 98. This will tend to increase the capacity of the power supply 64 and provide a more nearly DC voltage on the output. The time constants of the power supply 64 are preferably long enough to maintain the charge on the condenser 96 substantially constant for a period that is longer than the period between the successive transmitting pulses.

It can be appreciated each time a driving pulse travels along the transmission line 16 a certain amount of energy is absorbed before it reaches the transducer 30. Although this tends to reduce the amount of ultrasonic energy transmitted into the workpiece 12 normally the pulse 24 has a more than adequate amount of power to drive the transducer 30. As a consequence the amount of transmitted ultrasonic energy can be maintained above a suitable level.

In order to use the present invention, the transmission line 16 is plugged into the tester 10 and the search unit 14. The tester 10 is then turned on and the search unit 14 coupled to the workpiece 12 and scanned thereacross. At periodic intervals the rate generator 22 will trigger the pulser 24 and the horizontal sweep circuit 100. The pulser 24 sends a high voltage driving pulse over the transmission line 16 to the search unit 14. This pulse charges the condensers 94 and 96 in the power supply 64. However at the same time it travels across the amplifier 40. Since the driving pulse is normally in the area of several hundreds of volts it could conceivably damage the transistors 44 and 46 etc. if applied directly thereto. However the voltage dividing networks 50 and 82 will reduce the voltage reaching the transistors 44 and 46 to a safe level. In addition a first pair of reversed diodes 102 may be coupled across resistor 56 and a second pair of reversed diodes 104 may be coupled across resistor 88. These diodes 102 and 104 are of a relatively fast acting variety with a break down voltage on the order of one-half volt. As a consequence the voltage applied to the transistors 44 and 46 are of a safe level.

It is to be noted that each time one of the high voltage driving pulses is carried along the transmission line 16 to the transducer 30 a small part of the energy is stored on the condensers 94 and 96 in the power supply 64. This power supply 64 will thus maintain a direct charge on the collectors 62 and 74 which is sufficient to allow the transducers to function effectively. The time constant of the power supply 64 is sufficiently long to maintain the voltage substantially constant for a period of greater than the period between the successive pulses.

The high voltage driving pulse is coupled directly to the transducer 30 and is effective to cause the transducer 30 to transmit a pulse of ultrasonic energy into the workpiece 12. This energy will propagate through the workpiece 12 and if there are any discontinuities such as defects, laminations, reverse sides of the workpiece 12 etc., echoes will be reflected back to the transducer 30. Each time an echo is incident upon the transducer 30 a corresponding target pulse is generated and applied directly across the voltage dividing network 50. The signal including the target pulses will then be coupled through the two stages of the amplifier 40 and applied to the voltage dividing network 82. The amplified pulses are then applied to the transmission line 16 and returned to the receiver 32.

It is to be noted that if the gain of the amplifier 40 is sufficiently high a feed back loop could be created which would include the first dividing network 50 whereby the amplifier 40 would tend to oscillate or ring. To avoid this difficulty a pair of reversed diodes 106 are provided in the transmission line 16. These diodes 106 have a break down voltage somewhat greater than the amplified pulse. The driving pulse which energizes the transducer 30 will be coupled through these diodes 106 without being materially affected. However, the amplified pulse returning to the transmission line 16 is too low to break down either of the diodes 106 and the feed back loop is incomplete.

The amplified target pulses are returned along the transmission line 16 to the tester 10. The receiver 32 detects the returning signals containing the target pulses and couples them through the amplifier 34 to the vertical deflection means of the oscilloscope 18. As a consequence the oscilloscope 18 will produce a display which extends horizontally across the face of the tube 18 and includes one or more vertical "pips" 36 corresponding to the various targets present in the workpiece 12.

It can be seen that the present search unit 14 amplifies the returning or target pulses before they are carried over the transmission line 16 or before they have a chance to be mixed with an appreciable amount of noise. As a consequence even though some noise may be received along the transmission line 16 and mixed with the target pulses their amplitudes will be relatively large compared to that of the noise. Accordingly a relatively high signal-to-noise ratio will be maintained throughout the transmission line 16 and into the receiver 32. Moreover even though the transmission line 16 may have significant losses the target signals will still have large amplitudes at the time they reach the receiver 32. This is true even though the transmission line 16 is very long.

It is also to be noted that the search unit 14 is completely interchangeable with a conventional search unit. Accordingly the search unit 14 can be plugged into any readily available ultrasonic tester without any material alteration being made to the tester.

It has been found under some circumstances the driving pulses produced by the pulser 24 do not have an adequate amount of energy to charge the condensers 94 and 96 in the power supply 64 and drive the transducer 30 in the search unit 14. In order to overcome these difficulties it may be desirable to employ an embodiment similar to that shown in FIG. 3.

This embodiment 120 includes a search unit 122 for being coupled to the workpiece, a tester 124 for energizing the search unit 122 and a transmission line or cable 126 that interconnects the search unit 122 to the tester 124. The search unit 122 and cable 126 are substantially identical to those in the preceding embodiment. More particularly the search unit 122 includes the transducer 30, the preamplifier 40 and the power supply 64 having the energy storage condensers 94 and 96 therein.

The tester 124 includes a rate generator 128 for producing a series of periodically occurring timing pulses. This generator 128 may be substantially identical to the generator 22. One output from the rate generator 128 is coupled to a transmitter pulse 130 and to a power pulser 132. The transmitter pulser 130 may be substantially identical to the pulser 24 and is effective to produce a driving pulse 134 suitable for energizing the transducer in the search unit 122. These driving pulses 134 may be similar to the pulses shown in FIG. 4 and normally have a relatively high voltage but very short duration.

The power pulser 132 is also responsive to the periodically occurring timing pulses. However it produces pulses 136 containing considerably more energy than the driving pulses 134. By way of example, this power pulse 136 may be similar to the square wave pulse in FIG. 4. This pulse 136 normally has an amplitude on the same general order as that of the driving pulse 134. However the duration of this power pulse 136 is considerably longer than the duration of the driving pulse 134. This pulse 136 may thereby contain sufficient energy to energize the power supply in the search unit 122.

As a consequence the power supply 64 will be fully charged from the power pulse 136 and little or no energy will be absorbed out of the driving pulse 134. This, in turn, will preserve all of the power in the driving pulse 134 for energizing the transducer 30.

In addition the tester 124 includes a receiver 138 for receiving and/or detecting the signals from the transducer 30. This receiver 138 may be substantially identical to the receiver 32. Normally the pulses supplied to the receiver 138 include the driving pulses 134 and any returning echoes 140 received by the transducer 30. The power pulse 136 may be coupled to the receiver 138 or it may be blocked by appropriate means before it reaches the receiver 138. As will become apparent the presence or absence of this pulse 136 at the receiver input is not material to the operation of the system.

The output from the receiver 138 is coupled to the cathode ray tube 142 by means of an amplifier 144 which provides vertical deflection signals. The horizontal deflection means in the cathode ray tube 146 are coupled to the rate generator 128 by a horizontal sweep generator 146. The sweep generator 146 is effective to produce a series of "sawtooth" voltage waves in synchronism with the driving pulses 134.

The time duration of each individual "sawtooth" wave preferably corresponds to the time interval $t_1$ (as seen in FIG. 4). This interval $t_1$ commences just prior to the beginning of the driving pulse 134 and terminates after all of the echo pulses 140 have been received. At the end of the interval $t_1$ the horizontal generator 146 remains inactive for an interval corresponding to $t_2$. This time interval $t_2$ includes the occurrence of the square wave power pulse 136. As a consequence no horizontal sweep will occur in the tube 142 when the power pulse 136 is occurring. The visual display on the cathode ray tube 142 will, therefore, not include a portion corresponding to the power pulse. Instead it includes only vertical "pips" corresponding to the various transmitted energy and returning echoes.

It will be seen that with this embodiment virtually unlimited quantities of energy can be supplied for charging up the power supply on the search unit. At the same time little or no energy will be absorbed from the driving pulses.

It will be readily apparent to a person skilled in the art that numerous changes and modifications can be made to this invention without departing from the spirit thereof. For example it has been found some pulsers do not have adequate power output to energize the power supply 62 and also drive the transducer 30, particularly on thick and/or highly attenuative workpieces. Under these circumstances it is desirable for the power supply to be isolated from the driving pulses. In one embodiment this is accomplished by substituting a relatively small battery for the power supply. Preferably the battery is enclosed within the search unit 14. To conserve power the battery is maintained inoperative unless the operator manually closes a button switch on the search unit to turn the amplifier on. In another embodiment a third parallel conductor is provided along the transmission line 16. This wire is effective to supply a low DC voltage suitable for energizing the amplifier 40. Numerous other changes and modifications will be equally obvious. Accordingly the foregoing descriptions are for illustrative purposes only and do not in any way limit the invention which is defined only by the claims which follow.

I claim:

1. A search unit for use with test apparatus having a transmission line, said test apparatus being coupled to one end of said transmission line and said search unit being coupled to the other end of said transmission line, said search unit including:
   a transducer, said transducer being coupled to said tester and being responsive to signals from said tester via said transmission line and being adapted to transmit test energy into a workpiece and being adapted to receive return energy from the workpiece and produce corresponding energy;
   an isolation means being coupled between said search unit and said tester for limiting the transmitting energy to said transducer and isolating the received energy;
   a bypass circuit being coupled around said isolation means; and
   an amplifier being coupled in said bypass circuit and responsive to the corresponding received energy.

2. The search unit as defined in claim 1 and further including a housing wherein said transducer said isolation means said bypass circuit, and amplifier being disposed in said housing.

3. The search unit as defined in claim 1 wherein said isolation means including diodes.

4. An ultrasonic search unit for use with an ultrasonic tester adapted to be connected to a first end of a transmission line and having a transmitter-receiver for generating driving signals for transmission over said transmission line and for receiving electrical signals returned over said transmission line from said search unit, said search unit including the combination of:
   a search unit housing for being connected to the second end of said transmission line;
   a transducer in said housing effective to transmit ultrasonic energy in response to the driving signals, said transducer being effective to produce a receive signal in response to incident ultrasonic energy;
   an isolation means being disposed between said transducer and the second end of said transmission line for isolating received energy from said transducer to said tester but to pass energy from said tester to said transducer;
   a bypass circuit being disposed around said isolation means; and
   amplifier means in said housing and in said bypass circuit coupled to the transducer and adapted to be coupled to the second end of the transmission line, said amplifier means being adapted to apply the receive signal from said transducer to the second end of the transmission line.

5. An ultrasonic search unit for use with an ultrasonic tester adapter to be connected to a first end of a transmission line and having a transmitter-receiver for generating driving signals for transmission over said transmission line and for receiving electrical signals returned over said transmission line from said search unit, said search unit including the combination of:
   a search unit housing for being connected to a second end of said transmission line;
   a transducer in said housing effective to transmit ultrasonic energy in response to a driving signal, said transducer being effective to produce an electrical signal in response to incident ultrasonic energy;
   a first electrical path in said housing connected to said transducer and adapted to be connected to said second end of the transmission line for coupling the driving signals thereto;
   means disposed in said first electrical path for allowing the passage of driving signals from said tester to said transducer and impeding the passage of the electrical energy from said transducer to said tester in response to the incident ultrasonic energy;
   a second electrical path in said housing connected to said transducer and adapted to be connected to the second end of the transmission line; and
   an amplifier in said second path, said amplifier being effective to amplify said electrical signals and apply the amplified signal onto the transmission line for return to the transmitter-receiver.

6. An ultrasonic tester for inspecting a workpiece, said tester including the combination of:
   a transmitter for generating driving signals;
   a transmission line having the first end coupled to said transmitter and effective to carry said driving signals;
   a search unit housing;
   a transducer being disposed in said search unit housing and being coupled to the second end of said transmission line and effective to radiate ultrasonic energy in response to said driving signals;
   said transducer being adapted to be acoustically coupled to said workpiece for transmitting said ultrasonic energy into said workpiece and to receive ultrasonic energy from said workpiece and produce a corresponding electrical signal;
   an amplifier being disposed in said search unit housing with said transducer and being coupled thereto for amplifying the electrical signals produced by said transducer, said amplifier being coupled to the second end of the transmission line for applying the amplified electrical signals thereto for transmission over said line;
   energy storage means disposed in said search unit housing, said storage means being coupled to the transmission line and being adapted to store a portion of the energy in said driving signals;
   means for coupling said energy storage means to said amplifier whereby the energy stored in said energy storage means being adapted to power said amplifier; and
   a receiver coupled to the first end of the transmission line for receiving the amplified electrical signals.

7. The combination of claim 6 including timing means coupled to the transmitter for intermittently energizing the transmitter whereby the driving signal is a series of intermittent pulses.

8. An ultrasonic search unit for use with an ultrasonic tester having means for producing a series of intermittently occurring driving pulses for transmission over a transmission line and to receive electrical signals returning over said transmission line, said search unit including the combination of:
- a search unit housing;
- connector means on said housing adapted to be connected to the transmission line;
- a transducer in said housing coupled to the connector means, said transducer being responsive to said driving pulses to transmit ultrasonic energy and effective to produce electrical signals in response to ultrasonic energy incident thereon;
- an amplifier in said housing coupled to the transducer and to the connector means, said amplifier being effective to amplify said signals and couple them onto the transmission line;
- energy storage means in said housing effective to store a portion of the energy in said driving pulses for an interval greater than the interval between the pulses; and
- means coupling said storage means to said amplifier for supplying the power thereto.

9. An ultrasonic tester for inspecting a workpiece, said tester including the combination of:
- a transmitter for generating a first series of driving signals and a second series of power signals interspersed between the driving signals;
- a transmission line having a first end coupled to the transmitter and effective to carry said driving and power signals;
- a search unit coupled to the second end of said transmission line;
- a transducer in said search unit responsive to said driving signals to radiate ultrasonic energy, said transducer being effective to receive ultrasonic energy and to produce corresponding electrical signals;
- an amplifier in said search unit coupled to the transducer and said second end of said transmission line, said amplifier being effective to amplify said electrical signals and couple them onto the transmission line;
- a power supply in said search unit coupled to the amplifier, said power supply being effective to absorb power from said power signals and drive the amplifier; and
- a receiver coupled to the first end of the said transmission line for receiving the amplified electrical signals.

10. The combination of claim 9 wherein:
- the driving signals are short duration pulses containing ultrasonic frequencies; and
- said power signals having a duration which is considerably greater than the duration of the pulses in said driving signals.

11. An ultrasonic search unit for use with an ultrasonic tester and adapted to generate driving signals for transmission over a transmission line and to receive electrical signals returning over said transmission line, said search unit including the combination of:
- a search unit housing;
- a transducer in said housing and being adapted to be coupled to the transmission line, said transducer being responsive to driving signals and being effective to transmit ultrasonic energy into a workpiece, said transducer being responsive to incident ultrasonic energy reflected from a workpiece and being effective to produce corresponding electrical signals;
- an amplifier disposed in said housing and being coupled to said transducer and being effective to amplify the electrical signals and transmit them into the transmission line;
- a power supply disposed within said housing;
- means disposed in said housing and responsive to the driving signals for transferring a portion of the energy in the driving signals to said power supply; and
- means for coupling the power supply to said amplifier.

12. An ultrasonic search unit for use with an ultrasonic tester adapted to generate driving signals for transmission over a transmission line and to receive electrical signals returning over said transmission line, said search unit including the combination of:
- a search unit housing;
- a transducer being disposed in said housing and being adapted to be coupled to the transmission line, said transducer being responsive to driving signals and adapted to transmit ultrasonic energy, said transducer being responsive to incident ultrasonic energy and being adapted to produce corresponding electrical signals;
- an amplifier being disposed in said housing with said transducer and being coupled to the transducer and being adapted to amplify the electrical signals and to transmit them into the transmission lines;
- energy storage means being disposed in said housing;
- means within said housing and coupled to said storage means for transferring a portion of said energy in said driving signals into said storage means; and
- means for coupling the storage means to said amplifier whereby the storage means supplies the power for the operating amplifier.

13. The ultrasonic transducer unit as set forth in claim 12 wherein said energy storage means being a capacitor and further including:
- rectifying means being coupled to said capacitor and being adapted to transfer a portion of the energy in the driving signals to said capacitor whereby said capacitor accumulates an electrical charge; and
- means for coupling said capacitor to said amplifier for utilizing a portion of the stored charge to power said amplifier.

14. An ultrasonic tester for inspecting a workpiece said tester including the combination of:
- a search unit for scanning the surface of the workpiece;
- transmitter-receiver means for generating a series of driving signals and receiving a series of electrical signals;
- a transmission line connecting said transmitter receiver means to search unit;
- a transducer being disposed in said search unit connected to said transmission line and responsive to the signals provided by said transmitter-receiver unit for transmitting energy into a workpiece and for receiving ultrasonic energy reflected from the workpiece for producing corresponding electrical signals;
- threshold means being disposed in said search unit and connected to said transmission line between said transducer and the transmitter-receiver unit for passing only signals of a predetermined threshold level to trical signals produced by the reflected energy, said threshold level; and
- an amplifier being disposed in said search unit and coupled to said transducer for amplifying the electrical signals produced by the reflected energy, said amplifier including an input coupled connected to said transmission line between said threshold means and said transducer and an output coupled between said threshold means and said transmitter-receiver unit, the output of said amplifier being below said threshold level.

15. The test apparatus as defined in claim 14 wherein said threshold means including a pair of back-to-back coupled diodes.

16. The test apparatus as defined in claim 14 and including a housing wherein said transducer, said threshold means and said amplifier being disposed in said housing.

References Cited

UNITED STATES PATENTS

| | | | |
|---|---|---|---|
| 2,494,990 | 1/1950 | DeLano, Jr. | 73—67.9 |
| 2,549,895 | 4/1951 | DeLano, Jr. | 73—67.9 |
| 2,803,129 | 8/1957 | Bradfield | 73—67.8 |
| 3,038,328 | 6/1962 | Henry. | |
| 3,140,600 | 7/1964 | Howry | 73—67.7 |
| 3,211,252 | 10/1965 | Smith, Jr. et al. | |
| 3,222,635 | 12/1965 | Simpkins et al. | |
| 3,426,585 | 2/1969 | Zemanek, Jr. et al. | |

JAMES J. GILL, Primary Examiner